Aug. 22, 1944. L. M. CHRISTENSEN 2,356,381
PROCESS OF RETARDING THE DECOMPOSITION OF
UNFERMENTED MATTER DURING FERMENTATION
Filed Oct. 2, 1940
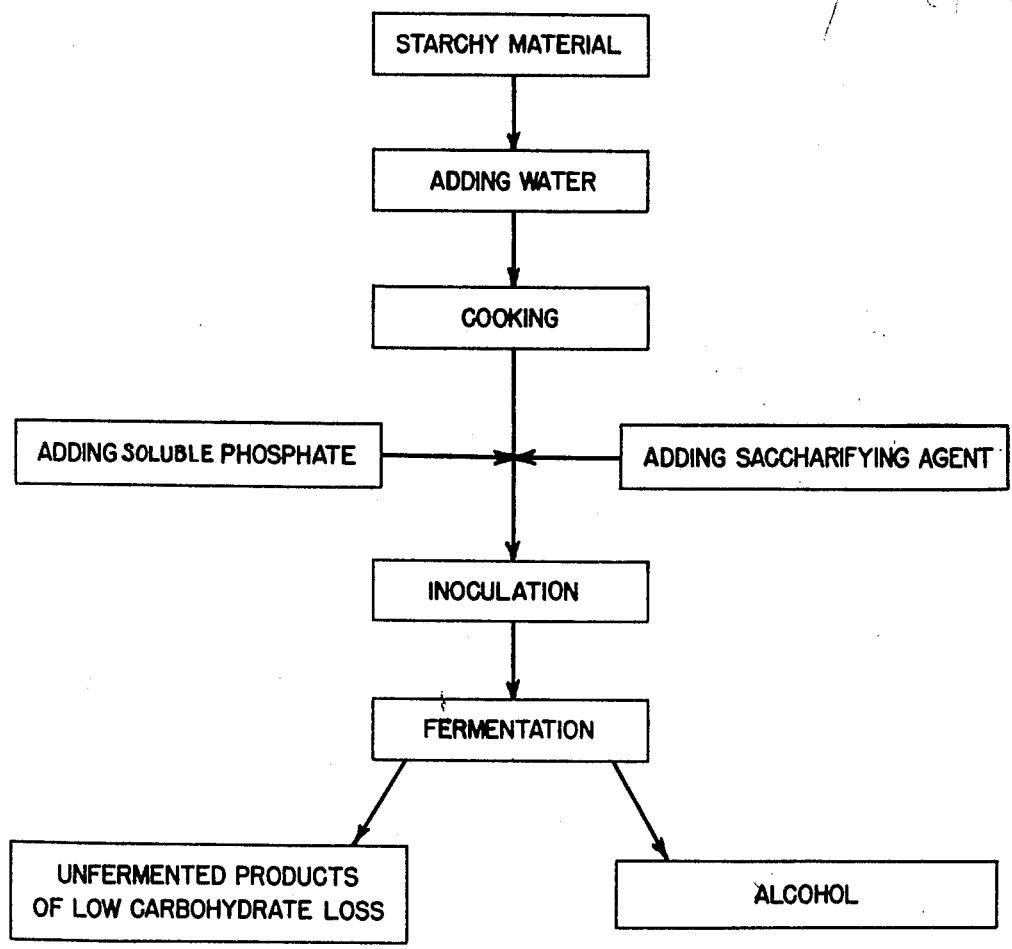
Inventor
LEO M. CHRISTENSEN
By Semmes, Keegin & Semmes
Attorneys Patented Aug. 22, 1944

2,356,381

UNITED STATES PATENT OFFICE 2,356,381

PROCESS OF RETARDING THE DECOMPOSITION OF UNFERMENTED MATTER DURING FERMENTATION

Leo M. Christensen, Moscow, Idaho, assignor to National Agrol Company, Inc., New York, N. Y., a corporation of Delaware Application October 2, 1940, Serial No. 359,434

8 Claims. (Cl. 195—14)

This invention relates generally to a method of fermentation, and more especially to a method of retarding the decomposition of unfermented matter during alcoholic fermentation.

In my co-pending application Serial No. 359,433, filed October 2, 1940, it was pointed out that the belief that all unfermented matter in mashes made from starchy materials and subjected to fermentation should be recoverable by evaporation of the residue after fermentation is not supported by the facts. On the contrary, a large part of such carbohydrates that remain at the completion of fermentation undergoes decomposition through a series of complex reactions and cannot be recovered.

For example, I have found that as much as 10 or 12% of the dry matter initially charged in the process may be lost when the present orthodox methods are followed. In the copending application mentioned above it was shown that with rapid mash cooling and with the use of an optimum concentration of a saccharifying agent, such as mold bran, barley malt or other enzymic material, this loss can be greatly reduced. In fact, under such conditions the loss is often reduced practically to zero.

However, further studies with a wide variety of grains have shown that in some cases losses of from 5 to 8% have occurred even when the concentration of the agent having diastatic properties was carefully adjusted to the optimum and the cooking temperature and other factors were as nearly optimum as could be established. For example, among grains, although corn and grain sorghums yield practically complete recovery of alcohol and by-products, substantial losses of the by-products occurred from the use of wheat. While losses of from 5 to 8% are less than those found in present orthodox practice, they are much too large to be tolerated in the efficient commercial production of alcohol.

One of the objects of this invention is to overcome the disadvantages of the prior art.

Another object of this invention is to provide a method of fermentation in which the decomposition of unfermented matter is retarded.

Still another object of this invention is to provide a method of fermentation in which the decomposition of unfermented carbohydrates is retarded by adding a soluble phosphate before or simultaneously with the addition of the saccharifying agent.

A further object of this invention is to provide a method of fermentation in which the decomposition of unfermented carbohydrates is retarded without interfering with the quantity of alcohol obtained by adding a soluble phosphate before or simultaneously with the addition of the saccharifying agent.

With these and other objects in view, my invention embraces broadly the discovery that the addition of soluble phosphates in proper amount serves to check the decomposition of unfermented carbohydrates during the fermentation process. In this connection, I have found that this decomposition is associated with the enzymic saccharification process rather than with alcoholic fermentation, and therefore the addition of such phosphates is without effect upon the alcohol yield although its influence upon the yield of dry residue is quite marked.

For example, when wheat is selected, the best cooking and saccharification conditions produced a yield of alcohol and feed representing 96% of the total dry matter charged to the process, but it was found that the addition of ammonium phosphate, $(NH_4)_2HPO_4$, to the extent of 0.05 gram per 100 c. c. of mash resulted in a recovery of 100% of the total dry matter charged to the process.

In another case it was found that the best recovery from potatoes without phosphate addition was 96% of the dry matter charged to the process but, when ammonium phosphate was added to the mash to produce a concentration of 0.03 to 0.05 gram per 100 c. c., recoveries reached 100%. Similar improvements were also obtained in the case of rye.

It has also been found that other soluble phosphates, such as potassium phosphate and sodium phosphate, give similar benefits. In this connection it should be noted that ammonium salts other than the phosphates were without effect upon dry residue recovery, although in some cases they served to improve alcohol yields and thus permitted improved over-all recovery, as is well known in the art.

In practicing the process, it should be remembered that the addition of phosphate must be carefully adjusted to the specific case in order to obtain the maximum benefits and therefore no definite and specific optimum can be given, but present experiments indicate that the optimum concentration lies between 0.01 and 0.05 gram per 100 c. c. when ammonium phosphate is selected. Although the use of ammonium phosphate is preferred, it is to be understood that other soluble phosphates can be used to accomplish same or similar results.

However, to accomplish these results it is necessary to add the selected phosphate simultaneously with or prior to the addition of the saccharifying agent to the cooked mash. In this way, the phosphate has an opportunity to regulate the saccharification process in such a way as to retard or prevent the formation of carbohydrates which are not fermentable but are in a chemical condition such that they will undergo decomposition to carbon dioxide and water during the subsequent fermentation, distillation and feed drying.

While for purposes of illustration I have disclosed a few of the phosphates which may be used in my invention, it is obvious that various equivalents can be used without departing from the scope of this invention.

I claim:

1. In the alcoholic fermentation of starchy materials, a process for increasing the percentage of recovery of the carbohydrates remaining at the completion of a process of alcoholic fermentation without decreasing the percentage of alcoholic yield comprising cooking the said starchy material to form a mash, adding an enzymatic saccharifying agent and a water soluble phosphate in the proportions of from 0.01 to 0.05 gram of phosphate to 100 c. c. of mash, to prevent the subsequent formation of carbohydrates subject to decomposition, said phosphate being added to the mash not later than the said saccharifying agent, fermenting the resulting mixture, and then recovering the residual carbohydrates after the fermentation has been completed.

2. In the alcoholic fermentation of starchy materials, a process for increasing the percentage of recovery of the carbohydrates remaining at the completion of a process of alcoholic fermentation, without decreasing the percentage of alcoholic yield, comprising cooking the said starchy material to form a mash, simultaneously adding an enzymatic saccharifying agent and a water soluble alkali phosphate in the proportions of from 0.01 to 0.05 gram of phosphate to 100 c. c. of mash, to prevent the subsequent formation of carbohydrates subject to decomposition, fermenting the resulting mixture, and then recovering the residual carbohydrates after the fermentation has been completed.

3. In the alcoholic fermentation of starchy materials, a porcess for increasing the percentage of recovery of the carbohydrates remaining at the completion of a process of alcoholic fermentation, without decreasing the percentage of alcoholic yield, comprising cooking the said starchy material to form a mash, adding an enzymatic saccharifying agent and sodium phosphate in the proportions of from 0.01 to 0.05 gram of phosphate to 100 c. c. of mash to prevent the subsequent formation of carbohydrates subject to decomposition, said phosphate being added to the mash not later than the said saccharifying agent, fermenting the resulting mixture and then recovering the residual carbohydrates after the fermentation has been completed.

4. In the alcoholic fermentation of starchy materials, a process for increasing the percentage of recovery of the carbohydrates remaining at the completion of a process of alcoholic fermentation, without decreasing the percentage of alcoholic yield, comprising cooking the said starchy material to form a mash, adding an enzymatic saccharifying agent and potassium phosphate in the proportions of from 0.01 to 0.05 gram of phosphate to 100 c. c. of mash, to prevent the subsequent formation of carbohydrates subject to decomposition, said phosphate being added to the mash not later than the said saccharifying agent, fermenting the resulting mixture and then recovering the residual carbohydrates after the fermentation has been completed.

5. In the alcoholic fermentation of starchy materials, a process for increasing the percentage of recovery of the carbohydrates remaining at the completion of a process of alcoholic fermentation, without decreasing the percentage of alcoholic yield, comprising cooking the said starchy material to form a mash, adding an enzymatic saccharifying agent and ammonium phosphate in the proportions of 0.01 to 0.05 gram of phosphate to 100 c. c. of mash, said phosphate being added to prevent the subsequent formation of carbohydrates subject to decomposition into carbon dioxide and water, said phosphate being added to the mash not later than the said saccharifying agent, and fermenting the resulting mixture, and then recovering the residual carbohydrates after the fermentation has been completed.

6. In the alcoholic fermentation of starchy materials, a process for increasing the percentage of recovery of the carbohydrates remaining at the completion of a process of alcoholic fermentation, without decreasing the percentage of alcoholic yield, comprising cooking the said starchy material to form a mash, simultaneously adding an enzymatic saccharifying agent and sodium phosphate, in the proportions of from 0.01 to 0.05 gram of phosphate to 100 c. c. of mash, to prevent the subsequent formation of carbohydrates subject to decomposition, fermenting the resulting mixture, and then recovering the residual carbohydrates after fermentation has been completed.

7. In the alcoholic fermentation of starchy materials, a process for increasing the percentage of recovery of the carbohydrates remaining at the completion of a process of alcoholic fermentation, without decreasing the percentage of alcoholic yield, comprising cooking the said starchy material to form a mash, simultaneously adding an enzymatic saccharifying agent and potassium phosphate in the proportions of from 0.01 to 0.05 gram of phosphate to 100 c. c. of mash, to prevent the subsequent formation of carbohydrates subject to decomposition, fermenting the resulting mixture, and then recovering the residual carbohydrates after fermentation has been completed.

8. In the alcoholic fermentation of starchy materials, a process for increasing the percentage of recovery of the carbohydrates remaining at the completion of a process of alcoholic fermentation, without decreasing the percentage of alcoholic yield, comprising cooking the said starchy material to form a mash, simultaneously adding an enzymatic saccharifying agent and ammonium phosphate in the proportions of 0.01 to 0.05 gram of phosphate to 100 c. c. of mash, said phosphate being added to prevent the subsequent formation of carbohydrates subject to decomposition, fermenting the resulting mixture and then recovering the residual carbohydrates after the fermentation has been completed.

LEO M. CHRISTENSEN.